(12) United States Patent
Sun et al.

(10) Patent No.: US 11,966,258 B2
(45) Date of Patent: Apr. 23, 2024

(54) TERMINAL PROVIDED WITH FLEXIBLE SCREEN

(71) Applicant: BOE Technology Group Co., Ltd., Beijing (CN)

(72) Inventors: Baofeng Sun, Beijing (CN); Meiling Gao, Beijing (CN)

(73) Assignee: BOE Technology Group Co., Ltd., Beijing (CN)

(*) Notice: Subject to any disclaimer, the term of this patent is extended or adjusted under 35 U.S.C. 154(b) by 261 days.

(21) Appl. No.: 17/636,705

(22) PCT Filed: Apr. 9, 2021

(86) PCT No.: PCT/CN2021/086120
§ 371 (c)(1),
(2) Date: Feb. 18, 2022

(87) PCT Pub. No.: WO2021/238433
PCT Pub. Date: Dec. 2, 2021

(65) Prior Publication Data
US 2022/0397937 A1    Dec. 15, 2022

(30) Foreign Application Priority Data

May 29, 2020  (CN) .......................... 202010477523.0

(51) Int. Cl.
*G06F 1/16*  (2006.01)
(52) U.S. Cl.
CPC .......... *G06F 1/1652* (2013.01); *G06F 1/1624* (2013.01)

(58) Field of Classification Search
CPC ... G06F 1/1624; G06F 1/1652; H04M 1/0268
See application file for complete search history.

(56) References Cited

U.S. PATENT DOCUMENTS 10,136,524 B2 * 11/2018 Choi ..................... H05K 5/0217
11,240,923 B2 *  2/2022 Wang .................... G06F 1/1652
(Continued)

FOREIGN PATENT DOCUMENTS

CN      101163163 A     4/2008
CN      104200753 A    12/2014
(Continued)

OTHER PUBLICATIONS

CN202010477523.0 first office action.

*Primary Examiner* — Anthony Q Edwards
(74) *Attorney, Agent, or Firm* — IPro, PLLC

(57) ABSTRACT

A terminal provided with a flexible screen, the terminal including a flexible screen assembly, a first fixed frame (6), a second fixed frame (7), a sliding roll-up assembly, and a magnetic component (9); the sliding roll-up assembly includes a first roller (3) and a second roller (4); the flexible screen assembly includes a flexible screen main body (1) and a rollable supporting component (2); the flexible screen assembly is supported by the first roller (3) and the second roller (4) and includes an opposite first side and second side; the first side is fixed to a first end of the first fixed frame (6), and the second side and the second fixed frame (7) are connected by an elastic member (8); the magnetic member (9) is provided on the support (5) and magnetically cooperates with the rollable supporting component (2).

14 Claims, 4 Drawing Sheets

(56) References Cited

U.S. PATENT DOCUMENTS

| | | | |
|---|---|---|---|
| 2008/0086925 A1 | | 4/2008 | Yang |
| 2012/0314400 A1* | | 12/2012 | Bohn .................. H04M 1/0237 |
| | | | 361/679.01 |
| 2013/0058063 A1* | | 3/2013 | O'Brien ................ G06F 1/1624 |
| | | | 361/807 |
| 2015/0373863 A1 | | 12/2015 | Lin et al. |
| 2018/0014417 A1* | | 1/2018 | Seo .................... H05K 7/20954 |
| 2020/0089279 A1 | | 3/2020 | Liao |
| 2020/0192434 A1 | | 6/2020 | Huang |
| 2021/0076517 A1 | | 3/2021 | Wang et al. |
| 2021/0366318 A1 | | 11/2021 | Feng |

FOREIGN PATENT DOCUMENTS

| | | |
|---|---|---|
| CN | 107680489 A | 2/2018 |
| CN | 108980197 A | 12/2018 |
| CN | 109064896 A | 12/2018 |
| CN | 110033707 A | 7/2019 |
| CN | 110047384 A | 7/2019 |
| CN | 110047385 A | 7/2019 |
| CN | 110534024 A | 12/2019 |
| CN | 110580860 A | 12/2019 |
| CN | 210156034 U | 3/2020 |
| CN | 111326070 A | 6/2020 |
| CN | 111613144 A | 9/2020 |
| KR | 20140121649 A | 10/2014 |

\* cited by examiner

TERMINAL PROVIDED WITH FLEXIBLE SCREEN

CROSS REFERENCE TO RELATED APPLICATIONS

The present application is a National Stage of International Application No. PCT/CN2021/086120, filed Apr. 9, 2020, which claims priority to Chinese Patent Application No. 202010477523.0, entitled "Terminal Provided with Flexible Screen", and filed to the China National Intellectual Property Administration on May 29, 2020, the entire contents of which are incorporated herein by reference.

FIELD

The present application relates to the technical field of display equipment, in particular to a terminal provided with a flexible screen.

BACKGROUND

Nowadays, flexible display panels have gradually entered the field of vision of consumers, and the rollability of screens has greatly expanded the application in the display field. When a flexible screen is used in a display apparatus, a sliding roll-up display apparatus may be formed, an area of a display area for displaying may be adjusted when the sliding roll-up display apparatus is used, and the sliding roll-up display apparatus may be rolled when not in use, storage is convenient, and space is saved, so that the sliding roll-up apparatus is used more and more widely.

In the current sliding roll-up display apparatus, when the flexible screen is stretched outwards and rolled out, the flexible screen is prone to warping in an area near a reel and a display area in the middle of the screen, so that the flatness is low, and this problem will seriously affect the reliability of the screen and reduces operating experience of a user.

SUMMARY

A terminal provided with a flexible screen, includes a flexible screen assembly, a first fixed frame, a second fixed frame, a sliding roll-up assembly, and a magnetic component;
  the sliding roll-up assembly includes a first roller and a second roller, the first roller and the second roller are mutually parallel and arranged in a first direction, the first roller and the second roller are connected by a support, the first roller is disposed on a side of the second roller facing away from the first fixed frame, and the sliding roll-up assembly performs reciprocating motion in the first direction;
  the flexible screen assembly includes a flexible screen main body and a rollable supporting component disposed on a side facing away from a display surface of the flexible screen main body, the flexible screen assembly is arranged around the sliding roll-up assembly, and the flexible screen assembly is supported by the first roller and the second roller;
  the flexible screen assembly further includes a first side and a second side that are opposite, the first side is fixed to a first end of the first fixed frame, the second side and the second fixed frame are connected by an elastic component, the first end of the first fixed frame and the second fixed frame are located on the same side of a plane where the support is located, the second fixed frame is located between the plane where the support is located and the first end of the first fixed frame, when the flexible screen assembly is located at a rolling station, the second fixed frame is located between the first roller and the second roller, and an area, between the first side and the first roller, in the flexible screen assembly forms a visible area; and
  the magnetic component is arranged on the support and located at a position between the first roller and the second roller and close to the first roller, and the magnetic component magnetically cooperates with the rollable supporting component to unroll the flexible screen assembly.

In some embodiments, the rollable supporting component includes a plurality of rigid supporting sheets arranged in an arrangement direction of the first side and the second side, and soft adhesives wrapping outer sides of the plurality of rigid supporting sheets and filled between the adjacent rigid supporting sheets.

In some embodiments, a surface of each rigid supporting sheet on a side facing the flexible screen main body and a surface of each rigid supporting sheet on a side facing away from the flexible screen main body are curved surfaces protruding towards the flexible screen main body; and a curvature of the curved surfaces is a same as a curvature of outer surfaces of the first roller and a curvature of outer surfaces of the second roller.

In some embodiments, a material of the rigid supporting sheets is a rigid material, and the rigid material may magnetically cooperate with the magnetic component.

In some embodiments, on a side of the soft adhesives facing away from the flexible screen main body, the soft adhesives, between two adjacent rigid supporting sheets, provides with a groove.

In some embodiments, in a direction from bottom of the groove to opening of the groove, a distance between two side faces of the grooves gradually increases.

In some embodiments, the rollable supporting component and the flexible screen main body are adhesively fixed.

In some embodiments, the first roller includes a first fixed shaft and a first rotating component; the first rotating component is sleeved on an outer side of the first fixed shaft and can rotate around the first fixed shaft, and two ends of the first fixed shaft are fixed to the support; and the second roller includes a second fixed shaft and a second rotating component, the first rotating component is sleeved on an outer side of the second fixed shaft and can rotate around the second fixed shaft, two ends of the second fixed shaft are fixed to the support, and a diameter of the first rotating component is greater than a diameter of the second rotating component.

In some embodiments, a plane where the first fixed shaft and the second fixed shaft are located is parallel to the visible area.

In some embodiments, the magnetic component is an electromagnet.

In some embodiments, the magnetic component magnetically cooperates with the rollable supporting component during an unrolling process of the flexible screen assembly; and the magnetic component does not work during a rolling process of the flexible screen assembly.

In some embodiments, the terminal provided with the flexible screen further includes a movable frame, arranged at an end of the support facing away from the second roller, the movable frame cooperates with the first fixed frame to form a containing space configured to contain the sliding roll-up assembly and the flexible screen assembly, and an opening of the containing space faces the visible area.

In some embodiments, the second fixed frame is fixed to the first fixed frame or the support.

REFERENCE NUMERALS

1—Flexible screen main body; 2—Rollable supporting component; 21—Rigid supporting sheet; 22—Soft adhesives; 23—Groove; 3—First roller; 31—First fixed shaft; 32—First rotating component; 4—Second roller; 41—Second fixed shaft; 42—Second rotating component; 5—Support; 51—Telescopic component; 52—First component; 53—Second component; 6—First fixed frame; 61—First end; 7—Second fixed frame; 8—Elastic component; 9—Magnetic component; 10—Movable frame.

DETAILED DESCRIPTION OF THE EMBODIMENTS

Technical solutions of embodiments of the present application will be described clearly and completely with reference to the accompanying drawings of embodiments of the present application. Apparently, the described embodiments are some, but not all, embodiments of the present application. Based on the described embodiments of the present application, all other embodiments attainable by those ordinarily skilled in the art without involving any inventive effort are within the protection scope of the present application.

Referring to FIG. 1, FIG. 2, FIG. 3, FIG. 4, and FIG. 5, the present application provides a terminal provided with a flexible screen, including a flexible screen assembly, a first fixed frame 6, a second fixed frame 7, a sliding roll-up assembly, and a magnetic component 9.

Figure 1:
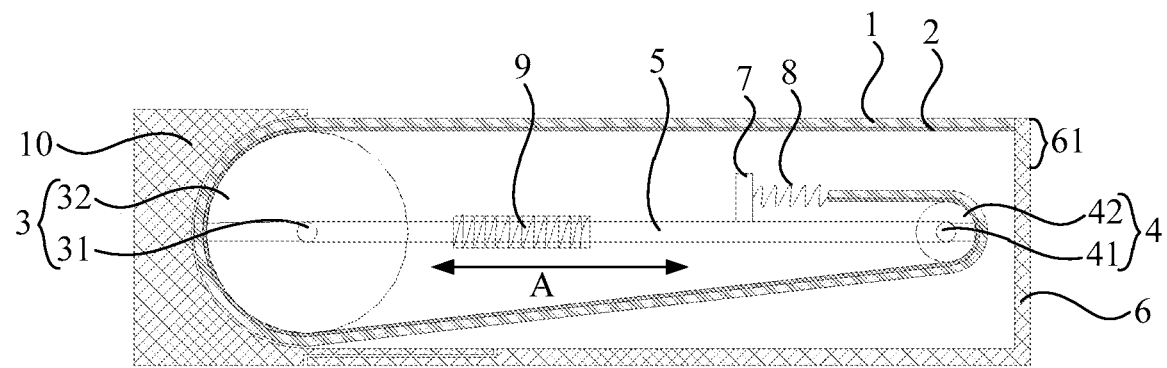
FIG. 1 is a side view of a first type of terminal provided with a flexible screen, provided by an embodiment of the present application.
Figure 3:
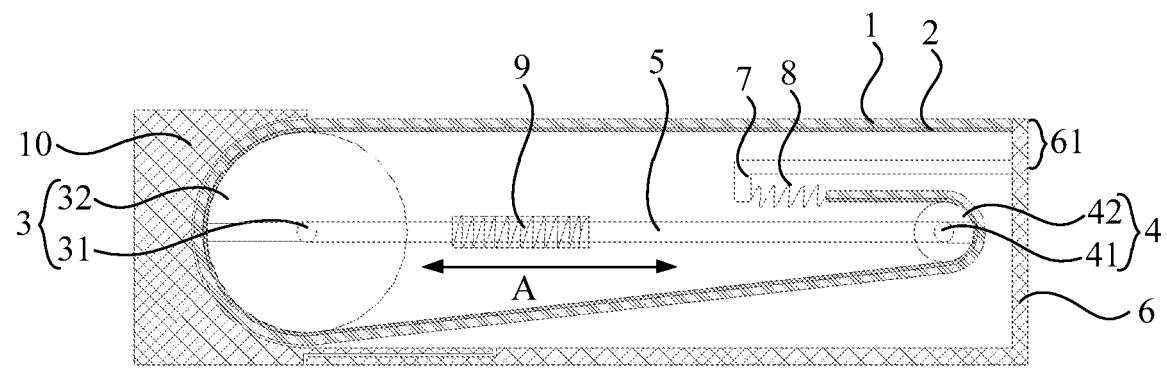
FIG. 3 is a side view of a second type of terminal provided with a flexible screen, provided by an embodiment of the present application.

The sliding roll-up assembly includes a first roller 3 and a second roller 4, the first roller 3 and the second roller 4 are mutually parallel and arranged in a first direction, the first roller 3 and the second roller 4 are connected by a support 5, the first roller 3 is disposed on a side of the second roller 4 facing away from the first fixed frame 6, and the sliding roll-up assembly performs reciprocating motion in the first direction (as shown in a direction A in FIG. 1 and FIG. 3).

The flexible screen assembly includes a flexible screen main body 1 and a rollable supporting component 2, disposed on a side facing away from a display face of the flexible screen main body 1, the flexible screen assembly is arranged around the sliding roll-up assembly and the flexible screen assembly is supported by the first roller 3 and the second roller 4; the flexible screen assembly further includes a first side and a second side that are opposite, the first side is fixed to a first end 61 of the first fixed frame 6, the second side and the second fixed frame 7 are connected by elastic components 8, the first end 61 of the first fixed frame 6 and the second fixed frame 7 are arranged on the same side of a plane where the support is located, the second fixed frame 7 is arranged between the plane where the support is located and the first end 61 of the first fixed frame 6, when the flexible screen assembly is located at a rolling station, the second fixed frame is arranged between the first roller and the second roller, and an area, between the first side and the first roller 3, in the flexible screen assembly forms a visible area.

The magnetic component 9 is arranged on the support 5, between the first roller 3 and the second roller 4, and close to the first roller; and the magnetic component 9 magnetically cooperates with the rollable supporting component 2 so that the flexible screen assembly is unrolled.

In the above-mentioned terminal provided with the flexible screen, the first side of the flexible screen assembly is fixedly connected to the first end 61 of the first fixed frame 6, the second side and the second fixed frame 7 are connected by the elastic components 8, and the flexible screen assembly is disposed around the sliding roll-up assembly and supported by the sliding roll-up assembly, so that the flexible screen assembly can be driven to be unrolled or rolled around the sliding roll-up assembly when the sliding roll-up assembly performs reciprocating motion in the first direction, when the sliding roll-up assembly moves in a direction away from the first side of the flexible screen assembly, a part of the flexible screen assembly except for the visible area moves around the sliding roll-up assembly in the first direction so as to increase an area of the visible area, and at the same time, the amount of expansion and contraction of the elastic components 8 gradually increases until the flexible screen assembly all is the visible area. When the sliding roll-up assembly moves in a direction close to the first side of the flexible screen assembly, the visible area part of the flexible screen assembly moves around the sliding roll-up assembly in a second direction opposite to the first direction so as to reduce the area of the visible area, and at the same time, the amount of expansion and contraction of the elastic elements 8 is gradually reduced, so that the flexible screen assembly is rolled around the sliding roll-up assembly. A user unrolls the flexible screen assembly to expand the field of vision during use, and rolls the flexible screen assembly after use. The terminal provided with the flexible screen in the present application is provided with the rollable supporting component 2 on the side of the flexible screen main body 1 facing away from the display surface, and the rollable supporting component 2 can increase the rigidity of the flexible screen assembly and prevent the flexible screen main body 1 from warping in an unrolling process, especially prevent an edge part of the flexible screen main body 1 from warping. In addition, the terminal provided with the flexible screen in the present application is provided with the magnetic components 9 configured to magnetically cooperate with the rollable supporting component 2, and the magnetic components 9 generate an adsorption force on the rollable supporting component 2 towards the sliding roll-up assembly, so that the flexible screen assembly is in contact with the sliding roll-up assembly more fully, and the flexible screen may be further prevented from warping. A part of the flexible screen assembly that is located near the first roller but not supported by the first roller is prone to warping, and the magnetic components 9 are disposed at the position between the first roller and the second roller and close to the first roller, so that the part of the flexible screen assembly close to the first roller is prevented from warping. Therefore, the flexible screen assembly in the terminal provided with the flexible screen in the present application has strong flatness, and user experience is better.

In some embodiments, the elastic components 8 may be springs or other elastic components, the quantity of the elastic components 8 may be multiple, and the elastic components 8 are evenly disposed between the second side and the second fixed frame so as to maintain the flatness of the flexible screen assembly.

Figure 4:
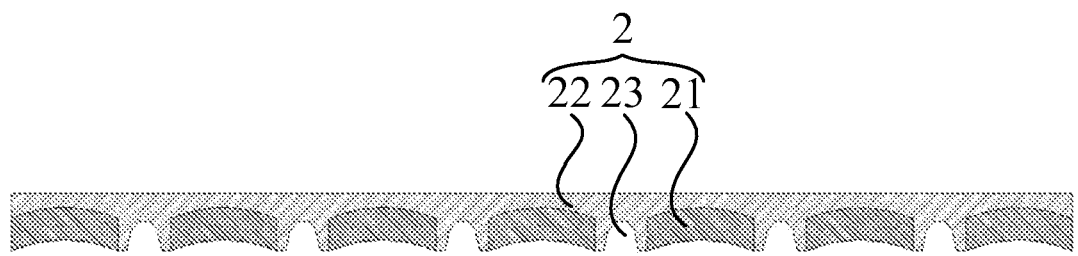
FIG. 4 is a side view of a rollable supporting component of a terminal provided with a flexible screen, provided by an embodiment of the present application.
Figure 5:
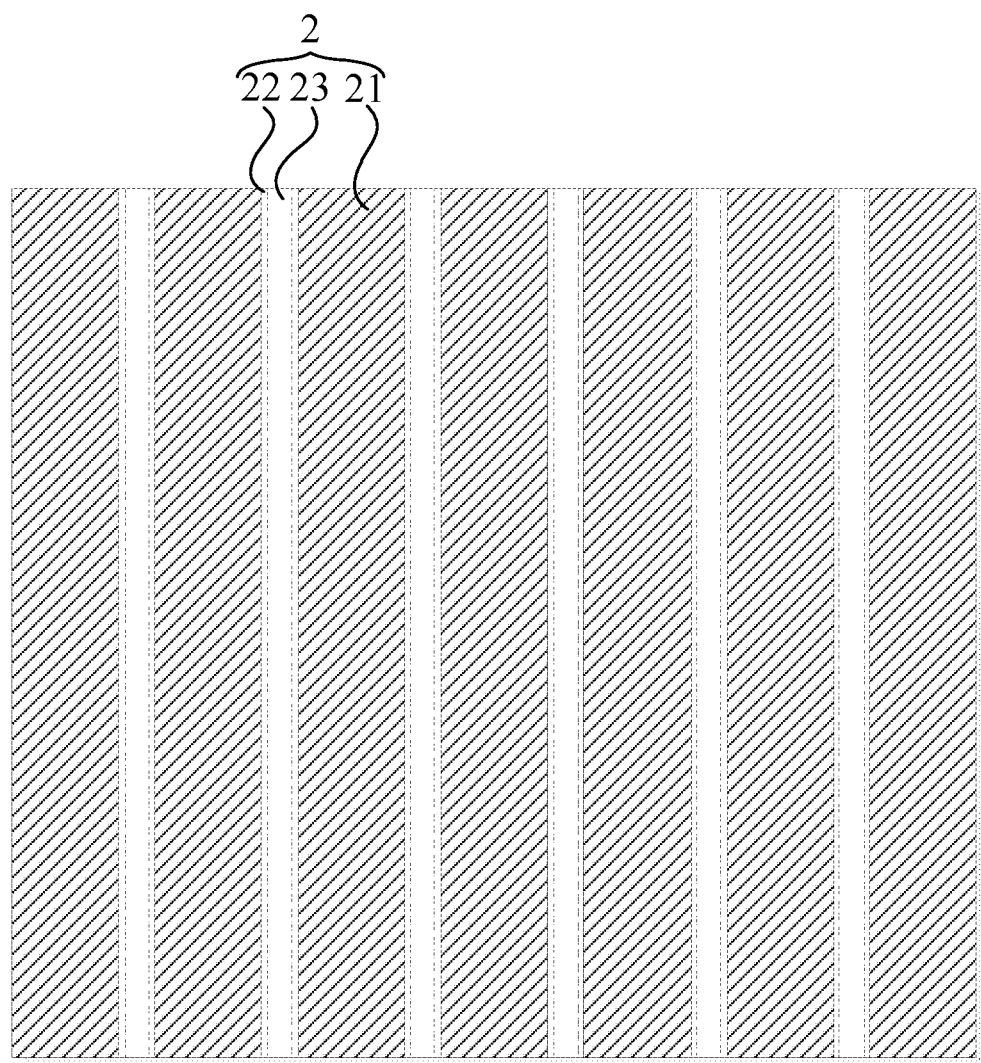
FIG. 5 is a top view of a rollable supporting component of a terminal provided with a flexible screen, provided by an embodiment of the present application.

In some embodiments, as shown in FIG. 4 and FIG. 5, the rollable supporting component 2 includes a plurality of rigid supporting sheets 21 arranged in an arrangement direction of the first side and the second side, and soft adhesives 22 wrapping outer sides of all the rigid supporting sheets 21 and filled between the adjacent rigid supporting sheets 21.

The rollable supporting component 2 includes the rigid supporting sheets 21 and the soft adhesives 22, the rigid supporting sheets 21 may provide support for the flexible screen main body 1, and the soft adhesives 22 wraps the rigid supporting sheets 21, so that the soft adhesives plays a role in connecting the rigid supporting sheets 21 on one hand, and can protect the flexible screen main body 1 and prevent the rigid supporting sheets 21 and a roller assembly from damaging the flexible screen main body 1 on the other hand.

In some embodiments, as shown in FIG. 4, a surface of each rigid supporting sheet 21 on a side facing the flexible screen main body 1 and a surface of each rigid supporting sheet 21 on a side facing away from the flexible screen main body 1 are curved surfaces protruding towards the flexible screen main body 1; and a curvature of the curved surfaces is same as a curvature of outer surfaces of the first roller 3 and a curvature of outer surfaces of the second roller 4.

The structure of the above-mentioned rigid supporting sheets 21 may make the rollable supporting component better laminated with the first roller and the second roller, so that the flexible screen assembly is better laminated with the outer surfaces of the first roller 3 and the second roller 4, and creases or warping is prevented. When the rollable supporting component 2 is in contact with the outer surfaces of the first roller 3 and the second roller 4, the soft adhesives 22 on the surface of one side of the rollable supporting component 2 facing away from the first roller 3 and the second roller 4 is stretched, and the soft adhesives 22 on the surface of one side of the rollable supporting component 2 facing the first roller 3 and the second roller 4 is contracted, and one side, close to the first roller 3 and the second roller 4, of the soft adhesives 22 located between the adjacent rigid supporting sheets 21 is squeezed by the adjacent rigid supporting sheets 21, so that the flexible screen assembly is completely laminated with the outer surfaces of the first roller 3 and the second roller 4.

In some embodiments, a material of the rigid supporting sheets 21 is a rigid material that may magnetically cooperate with the magnetic components 9.

The material of the rigid supporting sheets 21 in the present application may be a material that may magnetically cooperate with the magnetic components 9, such as metal or alloys, which is not particularly limited in the present application.

In some embodiments, as shown in FIG. 4 and FIG. 5, a groove 23 is formed at a position, opposite to a portion between every two adjacent rigid supporting sheets 21, of a side of the soft adhesives 22 facing away from the flexible screen main body 1.

When the flexible screen assembly is in contact with the outer surfaces of the first roller 3 and the second roller 4, the grooves 23 may directly absorb the deformation quantity between the adjacent rigid supporting sheets 21, the problems such as the creases and the warping are avoided without compressing the soft adhesives 22, and the effect is better.

In some embodiments, as shown in FIG. 4, in a direction from bottoms of the grooves 23 to openings, a distance between two side faces of the grooves 23 becomes larger and larger, which helps to better absorb the deformation quantity according to a bending direction.

In some embodiments, the rollable supporting component 2 and the flexible screen main body 1 are adhesively fixed.

The rollable supporting component 2 and the flexible screen main body 1 are adhesively fixed, a fixing mode is simple and a fixing effect is good. During adhesion, one side surface, configured to be laminated and fixed with the flexible screen main body 1, of the rollable supporting component 2 is coated with glue, and the flexible screen main body 1 is put on the glue-coated side surface of the rollable supporting component 2, so that the entire surface adhesion of the flexible screen main body 1 and the rollable supporting component 2 is achieved, in this way, there is no relative motion between the flexible screen main body 1 and the rollable supporting component 2, and the rollable supporting component 2 has a better supporting effect on the flexible screen main body 1 and further prevents the flexible screen main body from warping or generating creases.

Figure 2:
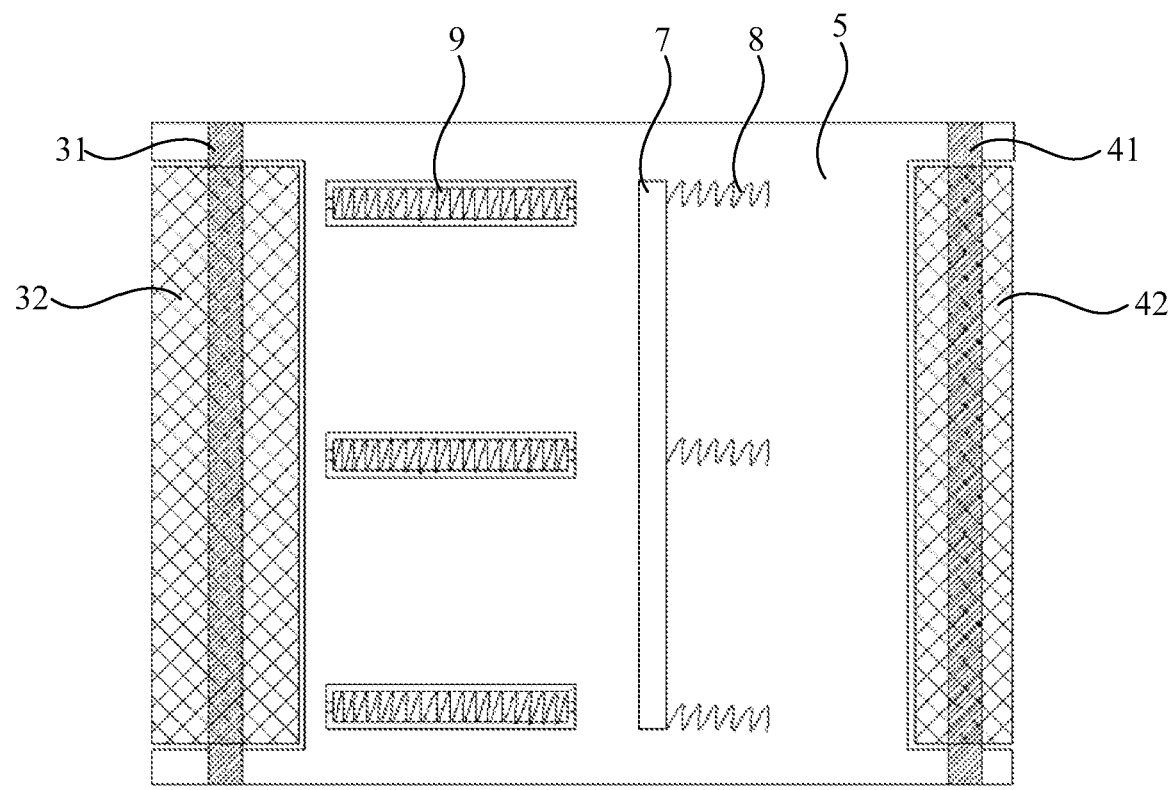
FIG. 2 is a top view of a componential structure in a terminal provided with a flexible screen, provided by an embodiment of the present application.

In some embodiments, as shown in FIG. 1 and FIG. 2, the first roller 3 includes a first fixed shaft 31 and a first rotating component 32 disposed on an outer side of the first fixed shaft 31 in a sleeving mode and capable of rotating around the first fixed shaft 31, and two ends of the first fixed shaft 31 are fixed to the support 5; and the second roller 4 includes a second fixed shaft 41 and a second rotating component 42 disposed on an outer side of the second fixed shaft 41 in a sleeving mode and capable of rotating around the second fixed shaft 41, two ends of the second fixed shaft 41 are fixed to the support 5, and a diameter of the first rotating component 32 is larger than a diameter of the second rotating component 42.

In some embodiments, since the first fixed shaft 31 and the second fixed shaft 41 are both fixed to the support 5, when the support 5 moves in the arrangement direction of the first roller 3 and the second roller 4, the first fixed shaft 31 and the second fixed shaft 41 may be driven to move synchronously. Since the first rotating component 32 and the second rotating component 42 are respectively disposed on the first fixed shaft 31 and the second fixed shaft 41 in a sleeving mode, in the moving process of the support 5, the flexible screen assembly are in rolling fit with the first rotating component 32 and the second rotating component 42, and therefore the flexible screen assembly is unrolled or rolled, and a rolling fit mode has low friction and can prevent damage to the flexible screen assembly.

In some embodiments, a diameter of the first rotating component 32 is greater than a diameter of the second rotating component 42, so that the flexible screen assembly can be easily switched between rolling and unrolling.

In some embodiments, the first roller 3 and the second roller 4 may only be shafts fixed to the support 5. In the implementation, the first roller 3 and the second roller 4 are in sliding fit with the flexible screen assembly.

In some embodiments, as shown in FIG. 1, planes where the first fixed shaft 31 and the second fixed shaft 41 are located are parallel to the visible area.

Since the diameter of the first rotating component 32 is greater than the diameter of the second rotating component 42, and the planes where the first fixed shaft 31 and the second fixed shaft 41 are located are parallel to the visible area, among parts, located on one side of the support 5 facing away from the visible area, of the flexible screen assembly, a part near the second roller 4 is closer to the visible area than a part near the first roller 3, which helps to keep the flatness of the parts, located on one side of the support 5 facing away from the visible area, of the flexible screen assembly.

In some embodiments, the magnetic components are electromagnets, and the magnetic components magnetically cooperate with the rollable supporting component in the unrolling process of the flexible screen assembly, and do not work in a rolling process of the flexible screen assembly.

The magnetic components 9 are more convenient to use and controllable by adopting the electromagnets, the electromagnets may be powered off when the flexible screen assembly is rolled so as to prevent resistance to the rolling of the flexible screen assembly, and the electromagnets are activated when the flexible screen assembly is unrolled, which helps to keep the flatness of the flexible screen assembly in the unrolling process of the flexible screen assembly.

As shown in FIG. 2, the electromagnets may be disposed in holes in the support 5, the quantity of the electromagnets may be multiple, the electromagnets may be uniformly disposed on the support 5 in an extending direction of the first roller 3, the quantity of the electromagnets may also be one, and a length of the electromagnets in the extending direction of the first roller 3 is the same as a length of the first roller 3.

In some embodiments, in one implementation, as shown in FIG. 1, the terminal provided with the flexible screen provided by the present application further includes a movable frame disposed at an end of the support away from the second roller, the movable frame 10 cooperates with the first fixed frame 6 to form a containing space configured to contain the sliding roll-up assembly and the flexible screen assembly, and an opening of the containing space faces the visible area.

The movable frame 10 in the above-mentioned terminal provided with the flexible screen is fixed to the support 5 and moves with the support 5, so that a width of the opening of the containing space is adjusted with the change of the visible area, so that the opening of the containing space exposes the entire visible area, when the flexible screen assembly is in a rolled state, the movable frame 10 and the first fixed frame 6 partially overlap on a side of the support 5 away from the visible area, and when the flexible screen assembly is in an unrolled state, overlapping parts between the movable frame 10 and the first fixed frame 6 are separated.

In some embodiments, the second fixed frame is fixed to the first fixed frame or the support.

In some embodiments, as shown in FIG. 3, the second fixed frame 7 is fixed to the first fixed frame 6. In the implementation, the second fixed frame 7 keeps fixed, and the sliding roll-up assembly performs reciprocating motion in the first direction, so that the elastic components are stretched or compressed.

In some embodiments, as shown in FIG. 1 and FIG. 2, the second fixed frame 7 is fixed to the support 5. In the implementation, the second fixed frame 7 performs reciprocating motion in the first direction along with the sliding roll-up assembly, and the second fixed frame 7 moves synchronously with the sliding roll-up assembly so as to reduce the deformation quantity of the elastic components compared to the case where the second fixed frame 7 is fixed, so that the flexible screen assembly is prevented from being influenced due to excessive tension to the flexible screen assembly, and the reliability of the flexible screen assembly is improved.

In some embodiments, the support 5 adopts a telescopic support, and includes a first component 52, a second component 53, and a telescopic component 51 located between the first component and the second component. The first component 52 is provided with the first roller 3 and may perform reciprocating motion in the first direction (as shown in the direction A in FIG. 6 and FIG. 7), so that the telescopic component 51 is stretched or compressed. The magnetic components 9 are disposed in the first component 52, the second component 53 is provided with the second roller 4, and an end of the second component 53 away from the first component 51 is fixed to the first fixed frame 6. In the process of rolling and unrolling the flexible screen assembly, the second component 53 is fixed and only the first component 52 performs reciprocating motion in the first direction so as to drive the flexible screen assembly to be rolled or unrolled.

Figure 6:
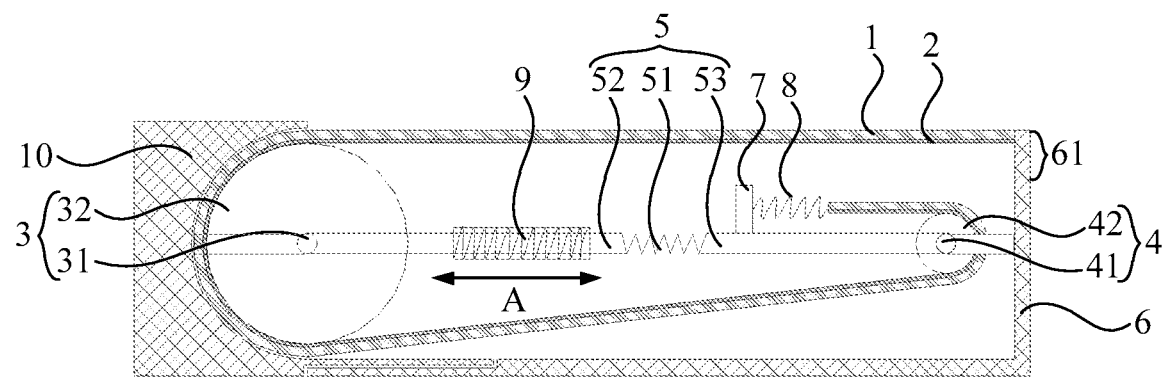
FIG. 6 is a side view of a third type of terminal provided with a flexible screen, provided by an embodiment of the present application.
Figure 7:
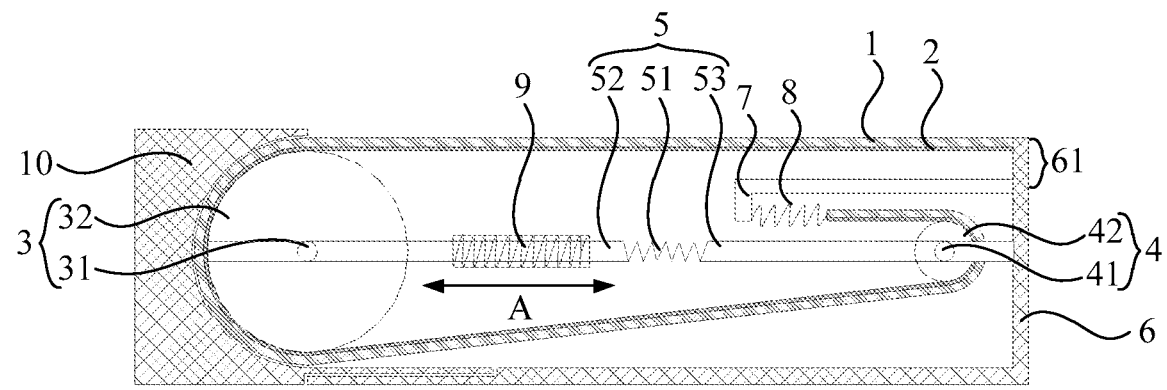
FIG. 7 is a side view of a fourth type of terminal provided with a flexible screen, provided by an embodiment of the present application.

When the support 5 adopts the telescopic support, the second fixed frame 7 may be fixed to the first fixed frame 6, as shown in FIG. 7, or the second fixed frame 7 may also be fixed to the second component 53 of the support, as shown in FIG. 6. The above-mentioned terminal provided with the flexible screen further includes a driving mechanism configured to drive the support 5 to move. The driving mechanism may be motor or other mechanisms that may be configured to drive the support 5 to perform reciprocating motion in the first direction, which is not limited in the present application.

It will be apparent to those skilled in the art that various modifications and variations can be made in the embodiments of the present application without departing from the spirit or scope of the present application. Thus, if these modifications and variations of the present application fall within the scope of the claims of the present application and its equivalent technology, the present application is also intended to include these modifications and variations.

What is claimed is:
1. A terminal provided with a flexible screen, comprising:
a flexible screen assembly,
a first fixed frame,
a second fixed frame,
a sliding roll-up assembly, and
a magnetic component; wherein:
the sliding roll-up assembly comprises:
a first roller, and
a second roller;
wherein the first roller and the second roller are parallel and arranged in a first direction, the first roller and the second roller are connected by a support, the first roller is arranged on a side of the second roller facing away from the first fixed frame, and the sliding roll-up assembly performs reciprocating motion in the first direction;
the flexible screen assembly comprises:
a flexible screen main body; and
a rollable supporting component, disposed on a side facing away from a display surface of the flexible screen main body;
wherein the flexible screen assembly is arranged around the sliding roll-up assembly, and the flexible screen assembly is supported by the first roller and the second roller;
the flexible screen assembly further comprises:
a first side, fixed to a first end of the first fixed frame; and
a second side, connected to the second fixed frame by an elastic component;
wherein the first side and the second side are opposite; the first end of the first fixed frame and the second fixed frame are arranged on a same side of a plane where the support is located; the second fixed frame is arranged between the plane where the support is located and the first end of the first fixed frame; and when the flexible screen assembly is at a rolling station, the second fixed frame is between the first roller and the second roller, and an area, between the first side and the first roller, in the flexible screen assembly forms a visible area; and
the magnetic component is arranged on the support, between the first roller and the second roller, and close to the first roller; and the magnetic component magnetically cooperates with the rollable supporting component to unroll the flexible screen assembly.

2. The terminal provided with the flexible screen according to claim 1, wherein the rollable supporting component comprises:
a plurality of rigid supporting sheets, arranged in an arrangement direction of the first side and the second side; and
soft adhesives, wrapping outer sides of the plurality of rigid supporting sheets and filled between adjacent rigid supporting sheets.

3. The terminal provided with the flexible screen according to claim 2, wherein a surface of each rigid supporting sheet on a side facing the flexible screen main body and a surface of each rigid supporting sheet on a side facing away from the flexible screen main body are curved surfaces protruding towards the flexible screen main body; and
a curvature of the curved surfaces is same as a curvature of an outer surface of the first roller and a curvature of an outer surface of the second roller.

4. The terminal provided with the flexible screen according to claim 2, wherein a material of the rigid supporting sheets is a rigid material, and the rigid material may magnetically cooperate with the magnetic component.

5. The terminal provided with the flexible screen according to claim 2, wherein on a side of the soft adhesives facing away from the flexible screen main body, the soft adhesives, between two adjacent rigid supporting sheets, is provided with a groove.

6. The terminal provided with the flexible screen according to claim 5, wherein in a direction from bottom of the groove to opening of the groove, a distance between two side faces of the grooves gradually increases.

7. The terminal provided with the flexible screen according to claim 1, wherein the rollable supporting component and the flexible screen main body are adhesively fixed.

8. The terminal provided with the flexible screen according to claim 1, wherein:
the first roller comprises:
a first fixed shaft, and
a first rotating component, wherein the first rotating component is sleeved on an outer side of the first fixed shaft and is rotatable around the first fixed shaft, and two ends of the first fixed shaft are fixed to the support;
the second roller comprises:
a second fixed shaft, and
a second rotating component, wherein the second rotating component is sleeved on an outer side of the second fixed shaft and is rotatable around the second fixed shaft, and two ends of the second fixed shaft are fixed to the support; and
a diameter of the first rotating component is greater than a diameter of the second rotating component.

9. The terminal provided with the flexible screen according to claim 8, wherein a plane where the first fixed shaft and the second fixed shaft are located is parallel to the visible area.

10. The terminal provided with the flexible screen according to claim 1, wherein the magnetic component is an electromagnet.

11. The terminal provided with the flexible screen according to claim 1, wherein the magnetic component magnetically cooperates with the rollable supporting component during an unrolling process of the flexible screen assembly; and
the magnetic component does not work during a rolling process of the flexible screen assembly.

12. The terminal provided with the flexible screen according to claim 1, further comprising:
a movable frame, arranged at an end of the support away from the second roller;
wherein the movable frame cooperates with the first fixed frame to form a containing space configured to contain the sliding roll-up assembly and the flexible screen assembly, and an opening of the containing space faces the visible area.

13. The terminal provided with the flexible screen according to claim 1, wherein the second fixed frame is fixed to the first fixed frame.

14. The terminal provided with the flexible screen according to claim 1, wherein the second fixed frame is fixed to the support.

* * * * *